(12) United States Patent
Gössi

(10) Patent No.: US 10,919,267 B2
(45) Date of Patent: Feb. 16, 2021

(54) CONTACT LAYER WITH MINERAL BINDER COMPONENT

(71) Applicant: SIKA TECHNOLOGY AG, Baar (CH)

(72) Inventor: Matthias Gössi, Uster (CH)

(73) Assignee: SIKA TECHNOLOGY AG, Baar (CH)

( * ) Notice: Subject to any disclaimer, the term of this patent is extended or adjusted under 35 U.S.C. 154(b) by 117 days.

(21) Appl. No.: 15/765,967

(22) PCT Filed: Dec. 20, 2016

(86) PCT No.: PCT/EP2016/082004
§ 371 (c)(1),
(2) Date: Apr. 4, 2018

(87) PCT Pub. No.: WO2017/108844
PCT Pub. Date: Jun. 29, 2017

(65) Prior Publication Data
US 2018/0290433 A1    Oct. 11, 2018

(30) Foreign Application Priority Data
Dec. 23, 2015   (EP) ..................................... 15202471

(51) Int. Cl.
| | |
|---|---|
| *B32B 13/12* | (2006.01) |
| *B32B 27/18* | (2006.01) |
| *B32B 27/32* | (2006.01) |
| *B32B 27/36* | (2006.01) |
| *B32B 25/14* | (2006.01) |
| *B32B 27/22* | (2006.01) |
| *B32B 27/34* | (2006.01) |
| *B32B 27/08* | (2006.01) |
| *B32B 27/28* | (2006.01) |
| *B32B 27/30* | (2006.01) |

(52) U.S. Cl.
CPC .............. *B32B 13/12* (2013.01); *B32B 25/14* (2013.01); *B32B 27/08* (2013.01); *B32B 27/18* (2013.01); *B32B 27/22* (2013.01); *B32B 27/283* (2013.01); *B32B 27/302* (2013.01); *B32B 27/304* (2013.01); *B32B 27/306* (2013.01); *B32B 27/32* (2013.01); *B32B 27/322* (2013.01); *B32B 27/34* (2013.01); *B32B 27/36* (2013.01); *B32B 2307/31* (2013.01); *B32B 2307/538* (2013.01); *B32B 2307/54* (2013.01); *B32B 2307/558* (2013.01); *B32B 2307/582* (2013.01); *B32B 2307/7265* (2013.01); *B32B 2307/748* (2013.01); *B32B 2419/00* (2013.01); *B32B 2419/06* (2013.01)

(58) Field of Classification Search
None
See application file for complete search history.

(56) References Cited

U.S. PATENT DOCUMENTS

| | | | |
|---|---|---|---|
| 6,500,520 B1 * | 12/2002 | Wiercinski | ............... C09J 7/381 |
| | | | 428/150 |
| 8,793,862 B2 | 8/2014 | Weber et al. | |
| 2010/0216960 A1 * | 8/2010 | Ahrens | ............... B01F 17/0028 |
| | | | 526/278 |
| 2013/0143023 A1 | 6/2013 | Herold et al. | |
| 2015/0231863 A1 | 8/2015 | Knebel et al. | |

FOREIGN PATENT DOCUMENTS

| | | |
|---|---|---|
| EP | 1 088 946 A2 | 4/2001 |
| WO | 02/14063 A1 | 2/2002 |
| WO | 2008/100777 A2 | 8/2008 |

OTHER PUBLICATIONS

Schwarz et al., "Kunststoff Verarbeitung" Vogel Buchverlag, 10th Edition, 2005, pp. 23-28, 59-60.
Mar. 16, 2017 International Search Report issued in International Patent Application No. PCT/EP2016/082004.
Mar. 16, 2017 Written Opinion of the International Searching Authority issued in International Patent Application No. PCT/EP2016/082004.
Jun. 11, 2020 Office Action issued in Australian Patent Application No. 2016378276.

* cited by examiner

*Primary Examiner* — Sheeba Ahmed
(74) *Attorney, Agent, or Firm* — Oliff PLC

(57) ABSTRACT

A contact layer used in waterproofing and roofing applications. The contact layer includes a mineral binder component B, thermoplastic polymer component P, and a surfactant component S. Also, a method for producing the contact layer, a method for binding two substrates to each other, a method for waterproofing a substrate, a waterproofed structure, a method for sealing a substrate against water penetration, a sealed construction for sealing a substrate against water penetration and a use of the contact layer as a waterproofing membrane.

18 Claims, No Drawings

CONTACT LAYER WITH MINERAL BINDER COMPONENT

TECHNICAL FIELD

The invention relates to contact layers for use in the construction industry, for example for basements, roofing and tunneling applications to protect concrete structures against water penetration.

BACKGROUND OF THE INVENTION

Waterproofing membranes are commonly used in the construction industry for sealing bases, underground surfaces or buildings against water penetration.

State-of-the-art waterproofing membranes are multilayer systems comprising a polymer-based barrier layer as the principal layer to provide watertightness. Typical polymers used in barrier layers include thermoplastics such as plasticized polyvinylchloride (p-PVC) and thermoplastic polyolefins (TPO) or elastomers such as ethylene-propylene diene monomer (EPDM) and crosslinked chlorosulfonated polyethylene (CSPE). One of the drawbacks of polymer-based barrier layers is their poor bonding properties; they typically show low bonding strength to adhesives that are commonly used in the construction industry, such as epoxy adhesives, polyurethane adhesives, and cementitious compositions. Therefore, a contact layer, for example, a fleece backing, is typically used to provide sufficient bonding of the polymer-based barrier layer and the structure to be waterproofed.

One of the main challenges related to the multilayer waterproofing membranes is to ensure watertightness after infiltration in case of leak in the barrier layer. Watertightness after infiltration means in general that the sealing construction should be able to prevent the infiltrated water from penetrating to the space between the membrane and the waterproofed surface. A leak in the barrier layer can be a result of inward growing tree roots, material failure or tensile or shear forces directed to the membrane. If the watertightness after infiltration is lost, water is able to flow laterally underneath the membrane and to invade the interior of the building structure. In such cases the exact location of the leak in the barrier layer is also difficult to detect.

U.S. Pat. No. 8,793,862B2 describes a waterproofing membrane comprising a barrier layer, a composite layer arranged on one side of the barrier layer and a network of sealant between the barrier layer and the composite layer. The network of sealant is said to limit the size of area affected by penetrating water in case of water leakage in the barrier layer. In waterproofing applications the membrane is applied on a subsurface in such way that the barrier layer is directed against a concrete base and the composite layer is facing the concrete casted against the membrane. During the hardening process, the composite layer is penetrated by the liquid concrete forming a good bond with the hardened concrete.

US2015/0231863A1 discloses a waterproofing membrane including a barrier layer and a functional layer including a thermoplastic polymer that changes consistency under influence of highly alkaline media and an adhesive. Once the functional layer gets into contact with liquid concrete, the thermoplastic polymer dissolves and allows the adhesive to bond to the cast concrete. The functional layer may additionally comprise other thermoplastic polymers, fillers or concrete constituents. The construction of the functional layer is said to enable working with membranes in adverse weather conditions without diminishing the adhesive capacity of the membrane.

One disadvantage of state-of-the-art multilayer waterproofing membranes is related to the use of adhesives, which increases the complexity of the membrane build-up and consequently the production costs of such membranes. The adhesive has to provide good binding to the low surface energy polymers in the barrier layers, form a strong bond to the contact layer and to fresh concrete and have a good resistance to varying temperature ranges, UV irradiation and oxidation. Adhesives fulfilling all the requirements, if available at all, are expensive and thus increase the production cost of such membranes by a significant amount.

Another disadvantage of state-of-the-art multilayer waterproofing membranes is related to the use of fleece backings as contact layer to provide sufficient bonding between the membrane and the substrate to be waterproofed. In waterproofing and roofing applications the adjacent membrane sheets have to be homogenously joined to each other in a reliable way to ensure watertightness of the sealing construction. Membranes having a fleece backing cannot be joined by heat welding but instead the edges of the membranes have to be bonded together either with an adhesive or with a sealing tape adhered on top of the seam and/or under the seam. The use of an adhesive or a sealing tape to join adjacent membrane sheets complicates the installation process and increases application costs.

SUMMARY OF THE INVENTION

The objective of the present invention is to provide a contact layer, which can be bonded to a thermoplastic layer without the use of adhesives.

Another objective is to provide a contact layer, which fully and permanently bonds to concrete and other cementitious compositions after hardening without the use of adhesives.

Still another objective of the present invention is to provide a contact layer, which has a good heat welding properties.

According to the invention, the aforementioned objectives are achieved with the contact layer according to claim 1.

The main concept of the invention is that the contact layer comprises a mineral binder component, a thermoplastic polymer component and a surfactant component.

The combination of the mineral binder component, the thermoplastic polymer component and the surfactant component enables the contact layer to be bonded with thermoplastic layers and to cementitious compositions after hardening. It has been found by the inventors of the present invention that the presence of the surfactant component in the contact layer significantly increases the strength of adhesion by which the contact layer is bonded to cementitious compositions.

Without being bound by any theory it is believed that the presence of surfactants in the contact layer eases the "water-flow" through the percolated binder cavities in the polymer matrix, which enables partial hydration of the binder particles in the contact layer and formation adhesion through hardening of the mineral binder component.

One of the advantages of the present invention is that the contact layer can be bonded to thermoplastic layers and to cementitious compositions without the use of adhesives. This enables the use of waterproofing and roofing membranes, which have simple built-up and which can thus be produced with lower costs compared to state-of-the-art membranes.

Another advantage of the present invention is that the contact layer has good heat welding properties, which means that adjacent contact layers or thermoplastic membranes comprising a contact layer can be homogeneously joined by heat welding instead of using an adhesive or sealing tape to bond overlapping membrane sheets.

In another aspect of the present invention there is provided a method for producing a contact layer, a method for binding to substrates together, a method for waterproofing a substrate, a waterproofed construction, a method for sealing a substrate, a sealedd arrangement and to use of the contact layer as a waterproofing membrane.

DETAILED DESCRIPTION OF THE INVENTION

The term "polymer" designates collective of chemically uniform macromolecules produced by a polyreaction (polymerization, polyaddition, polycondensation) where the macromolecules differ with respect to their degree of polymerization, molecular weight and chain length. The term also comprises derivatives of said collective of macromolecules resulting from polyreactions, that is, compounds which are obtained by reactions such as, for example, additions or substitutions, of functional groups in predetermined macromolecules and which may be chemically uniform or chemically non-uniform.

The term "polymer component" designates polymer compositions comprising one or more polymers.

The term "melting point" designates the maximum of the curve determined according to ISO 11357 standard by means of dynamic differential calorimetry (DSC). At the melting point the material undergoes transition from the solid to the liquid state. The measurement can be performed with a Mettler Toledo 822e device at a heating rate of 2 degrees centigrade/min. The melting point values can be determined from the measured DSC curve with the help of the DSC software.

The term "surfactant" designates surface tension lowering substances. Surfactants are usually organic compounds containing both hydrophobic and hydrophilic groups. Based on the charge of the hydrophilic group the surfactants are classified to anionic, cationic, amphoteric, non-ionic surfactants.

By calcium carbonate as mineral filler is understood in the present document calcitic fillers produced from chalk, limestone or marble by grinding and/or precipitation.

The term "sand" designates mineral clastic sediments (clastic rocks) which are loose conglomerates (loose sediments) of round or angular small grains, which were detached from the original grain structure during the mechanical and chemical degradation and transported to their deposition point, said sediments having an $SiO_2$ content of greater than 50 wt.-%, in particular greater than 75 wt.-%, particularly preferably greater than 85 wt.-%.

The term "mineral binder" designates a binder, which in the presence of water reacts in a hydration reaction under formation of solid hydrates or hydrate phases. In particular, the term "mineral binder" refers to non-hydrated mineral binders, i.e. mineral binders, which have not been mixed with water and reacted in a hydration reaction.

The term "hydraulic binder" designates substances that harden as a result of chemical reactions with water ("hydration reactions") and produce hydrates that are not water-soluble. In particular, the hydration reactions of the hydraulic binder take essentially place independently of the water content. This means that hydraulic binders can harden and retain their strength even when exposed to water, for example underwater or under high humidity conditions. Examples of hydraulic binders include cement, cement clinker and hydraulic lime. In contrast, "non-hydraulic binders" such as air-slaked lime (non-hydraulic lime) and gypsum, are at least partially water soluble and must be kept dry in order to retain their strength.

The term "gypsum" designates any known form of gypsum, in particular calcium sulfate dehydrate, calcium sulfate α-hemihydrate, calcium sulfate ß-hemihydrate, or calcium sulfate anhydrite or mixtures thereof.

The term "latent hydraulic binders" designates particular type II concrete additives with latent hydraulic character according to DIN EN 206-1:2000. These materials are calcium aluminosilicates that are not able to harden directly or harden too slowly when mixed with water. The hardening process is accelerated in the presence of alkaline activators, which break the chemical bonds in the binder's amorphous (or glassy) phase and promote the dissolution of ionic species and the formation of calcium aluminosilicate hydrate phases. Examples of latent hydraulic binders include granulated blast furnace slag.

The term "pozzolanic binders" designates in particular type II concrete additives with pozzolanic character according to DIN EN 206-1:2000. These materials are siliceous or aluminosilicate compounds that react with water and calcium hydroxide to form calcium silicate hydrate or calcium aluminosilicate hydrate phases. Pozzolanic binders include natural pozzolans such as trass and artificial pozzolans such as fly ash and silica fume.

The term "cement" designates ground hydraulic binders, which apart from the hydraulic binders as the main constituents, usually contain small quantities of calcium sulfate (gypsum and/or hemihydrate and/or anhydrite), and optionally secondary constituents and/or cement additives such as grinding aids. The main constituents are contained in quantities of more than 5% by weight. The main constituents can be Portland cement clinker, also referred to as clinker or cement clinker, slag sand, natural or artificial pozzolans, fly ash, for example, siliceous or calcareous fly ash, burnt shale, limestone and/or silica fume. As secondary constituents, the cements can contain up to 5% by weight of finely divided inorganic, mineral substances, which originate from clinker production.

The term "cementitious composition" designates concrete, shotcrete, grout, mortar, paste or a combination thereof. The terms "paste", "mortar", "concrete", "shotcrete", and "grout" are well-known terms in the state-of-the-art. Pastes are mixtures comprising a hydratable cement binder, usually Portland cement, masonry cement, or mortar cement. Mortars are pastes additionally including fine aggregate, for example sand. Concrete are mortars additionally including coarse aggregate, for example crushed gravel or stone. Shotcrete is concrete (or sometimes mortar) conveyed through a hose and pneumatically projected at high velocity onto a surface. Grout is a particularly flowable form of concrete used to fill gaps. The cementitious compositions can be formed by mixing required amounts of certain components, for example, a hydratable cement, water, and fine and/or coarse aggregate, to produce the particular cementitious composition.

The term "fresh cementitious composition" or "liquid cementitious composition" designate cementitious compositions before hardening, particularly before setting.

The present invention relates in a first aspect of the invention to a contact layer comprising a mineral binder component B, a thermoplastic polymer component P, and a surfactant component S, wherein the amount of the mineral binder component B is 10.0-90.0 wt.-%, preferably 20.0-85.0 wt.-%, more preferably 25.0-80.0 wt.-%, most preferably 30-75 wt.-%, based on the total weight of the contact layer.

The contact layer is typically a sheet-like element having top and bottom surfaces (first and second surfaces of the contact layer) defined by peripheral edges.

The thermoplastic polymer component P may have a Young's modulus measured according to ISO 527-3 standard at a temperature of 23° C. of not more than 1000 MPa, more preferably not more than 750 MPa, even more preferably not more than 500 MPa, most preferably not more than 450 MPa. In particular, the thermoplastic component P may have a Young's modulus measured according to ISO 527-3 standard at a temperature of 23° C. in the range from 50 to 1000 MPa, preferably from 50 to 750 MPa, more preferably from 100 to 750 MPa, most preferably from 100 to 700 MPa. Contact layers containing a thermoplastic polymer component P having a Young's modulus at the above mentioned ranges were found to provide good concrete adhesion strengths.

Preferably, the thermoplastic polymer component P has a Young's modulus measured according to ISO 527-3 standard at a temperature of 23° C. of less than 100 MPa, more preferably less than 50 MPa, even more preferably less than 50 MPa, most preferably less than 10 MPa. Contact layers with the thermoplastic polymer component P having Young's modulus at the above mentioned ranges were found to have particularly good concrete adhesion strength.

The glass transition temperature ($T_g$) of the thermoplastic polymer component P is preferably below the temperatures occurring during the use of the contact layer. It is therefore preferred that the $T_g$ of the thermoplastic polymer component P is below 0° C., more preferably below −15° C., most preferably below −30° C.

The term "glass transition temperature" refers to the temperature measured with DSC according to ISO 11357 standard above which temperature a polymer component becomes soft and pliable, and below which it becomes hard and glassy. The measurements can be performed with a Mettler Toledo 822e device at a heating rate of 2 degrees centigrade/min. The $T_g$ values can be determined from the measured DSC curve with the help of the DSC software.

The mineral binder component B is preferably dispersed throughout, preferably uniformly, the thermoplastic polymer component P in the contact layer to ensure that the properties of the contact layer do not change considerably along the length of the layer.

The mineral binder component B is preferably present in the contact layer as a discontinuous particle based phase, which is dispersed in a continuous phase of the thermoplastic polymer component P.

Preferably, the contact layer has concrete adhesion strength of at least 5 N/50 mm, more preferably of at least 10 N/50 mm, even more preferably of at least 15 N/50 mm, most preferably of at least 20 N/50 mm. In particular, the contact layer has concrete adhesion strength of at least 30 N/50 mm, preferably of at least 35 N/50 mm, more preferably of at least 40 N/50 mm, even more preferably of at least 45 N/50 mm, most preferably of at least 50 N/50 mm.

Preferably, the contact layer has concrete adhesion strength in the range of 5-400 N/50 mm, more preferably of 10-350 N/50 mm, even more preferably of 15-300 N/50 mm, most preferably of 20-250 N/50 mm.

The term "concrete adhesion strength of a contact layer" refers to the average peel resistance [N/mm] per unit width of the contact layer upon peeling the contact layer from a surface of a concrete specimen, which has been casted on the surface of the contact layer and hardened for 28 days under standard atmosphere (air temperature 23° C., relative air humidity 50%).

In the context of the present invention, the concrete adhesion strength of a contact layer is determined using the measurement method described below.

Method for Determining the Concrete Adhesion Strength of a Contact Layer

For the determination of the concrete adhesion strength, the contact layer is bonded to a polyethylene-based barrier layer WT 1210 HE available form Sika to obtain a test membrane, which can be used in measuring the average peel resistance from a hardened concrete specimen. The thickness of the barrier layer is approximately 0.5 mm. The barrier layer can be bonded to the contact layer by welding or by adhesion with any adhesive suitable for the purpose, such as Sikadur-31 CF available from Sika.

For the measurement of the average peel resistance, a concrete test specimen having a sample of the test membrane adhered on its surface is first prepared.

A sample membrane with a dimension of 200 mm (length)×50 mm (width) is first cut from the test membrane. One edge of the sample membrane on the side of the contact layer is covered with an adhesive tape having a length of 50 mm and a width coinciding with the width of the sample membrane to prevent the adhesion to the hardened concrete. The adhesive tapes are used to provide easier installation of the concrete test specimens to the peel resistance testing apparatus. The sample membrane is placed into a formwork having a dimension of 200 mm (length)×50 mm (width)×30 mm (height) with the contact layer of the sample membrane facing upwards and the barrier layer against the bottom of the formwork.

For the preparation of the concrete specimen, a fresh concrete formulation is prepared by mixing 46.3 wt.-% of sand having a particle size of 0-1 mm, 7.1 wt.-% of Nekafill-15 (from KFN) concrete additive (limestone filler), 32.1 wt.-% of CEM 142.5 N cement (preferably Holcim Normo 4), 14.3 wt.-% of water and 0.2 wt.-% of Viscocrete® PC2 solution (from Sika) in a cement mixer for five minutes. The dry components of the concrete formulation are mixed and homogenized for two minutes in a tumbling mixer before blending with the liquid components.

The formwork containing the sample membrane is subsequently filled with the fresh concrete formulation and vibrated for two minutes to release the entrapped air. After hardening for one day the concrete specimen is stripped from the formwork and stored under standard atmosphere (air temperature 23° C., relative air humidity 50%) for 28 days before measuring the average peel resistance.

The average peel resistance upon peeling the sample membrane from the surface of the concrete specimen is measured using a Zwick Roell AllroundLine Z010 material testing apparatus equipped with a Zwick Roell 90°-peeling device or using a similar testing apparatus fulfilling the requirements of the DIN EN 1372 standard.

In the peel resistance measurement, the concrete specimen is clamped with the upper grip of the material testing apparatus for a length of 10 mm at the end of the concrete specimen comprising the taped section of the sample membrane. Following, the sample membrane is peeled off from the surface of the concrete specimen at a peeling angle of 90° and at a constant cross beam speed of 100±10 mm/min. During the peel resistance measurement the distance of the rolls is preferably approximately 570 mm. The peeling of the sample membrane is continued until a length of approximately 140 mm of the sample membrane is peeled off from the surface of the concrete specimen. The average peel resistance is calculated as average peel force per unit width of the membrane [N/50 mm] during peeling over a length of approximately 70 mm thus excluding the first and last quarter of the total peeling length from the calculation.

Preferably, the mineral binder component B comprises at least one mineral binder selected from the group consisting of hydraulic, non-hydraulic, latent hydraulic, pozzolanic binders, and mixtures thereof. The mineral binder component B can further comprise inert substances such as sand, calcium carbonate, crystalline silicas, talc, pigments, and mixtures thereof.

The mineral component B preferably comprises a hydraulic binder, in particular cement or cement clinker. The mineral binder component B can further comprise latent hydraulic and/or pozzolanic binders, preferably slag and/or fly ash. In one embodiment, the mineral binder component B contains 5.0-50.0 wt.-%, preferably 5.0-40.0 wt.-%, more preferably 5.0-30.0 wt.-% of latent hydraulic and/or pozzolanic binders, preferably slag and/or fly ash and at least 35.0 wt.-%, more preferably at least 65.0 wt.-% of hydraulic binder, preferably cement or cement clinker.

Preferably, the mineral binder component B is a hydraulic binder, preferably cement.

The cement can be any conventional cement, for example, one in accordance with the five main cement types according to DIN EN 197-1: namely, Portland cement (CEM I), Portland composite cements (CEM II), blast-furnace cement (CEM III), pozzolan cement (CEM IV) and composite cement (CEM V). These main cement types are subdivided, depending on the amount added, into an additional 27 cement types, which are known to the person skilled in the art and listed in DIN EN 197-1. Naturally, all other cements that are produced according to another standard are also suitable, for example, according to ASTM standard or Indian standard. To the extent that reference is made here to cement types according to DIN standard, this naturally also relates to the corresponding cement compositions which are produced according to another cement standard.

The mineral binder component B is preferably in the form of finely divided particles, in order to obtain a contact layer with uniform surface properties. The term "finely divided particles" refers to particles, whose median particle size $d_{50}$ does not exceed 500 µm. The term median particle size $d_{50}$ refers to a particle size below which 50% of all particles by volume are smaller than the $d_{50}$ value.

The term "particle size" refers to the area-equivalent spherical diameter of a particle. The particle size distribution can be measured by laser diffraction according to the method as described in standard ISO 13320:2009. For determination of the particle size distribution, the particles are suspended in water (wet dispersion method). A Mastersizer 2000 device (trademark of Malvern Instruments Ltd, GB) can be used in measuring particle size distribution.

Preferably the median particle size $d_{50}$ of the mineral binder component B is 1.0-300.0 µm, more preferably 1.5-250.0 µm, even more preferably 2.0-200.0 µm, most preferably 2.0-150.0 µm.

Preferably, less than 40 wt-%, more preferably less than 30 wt.-%, even more preferably less than 20-wt.-%, most preferably less than 10 wt.-% of the particles of the mineral binder component B have a particle size of less than 5 µm and preferably less than 40 wt.-%, more preferably less than 30 wt.-%, even more preferably less than 20-wt.-%, most preferably less than 10 wt.-% of the particles of the mineral binder component B have a particle size of above 100 µm.

Preferably, the overall particle size of the mineral binder component B (of at least 98 percent of the particles) is below 250 µm, more preferably below 200 µm, even more preferably below 100 µm.

Preferably, the surfactant component S comprises at least one surfactant selected from the group consisting of anionic, cationic, amphoteric, non-ionic surfactants, and polymeric surfactants and mixtures thereof.

Examples of anionic surfactants include surfactants containing carboxylate, sulfate, phosphate or sulfonate groups, such as amino acid derivatives; fatty alcohol ether sulfates; fatty alcohol sulfates; soaps; alkylphenol ethoxylates; fatty alcohol ethoxylates; alkanesulfonates; olefinsulfonates; and alkyl phosphates.

Examples of cationic surfactants include quaternary ammonium or phosphonium compounds, such as, for example, tetraalkylammonium salts; N,N-dialkylimidazoline compounds; dimethyldistearylammonium compounds, N-alkylpyridine compounds; and ammonium chlorides.

Amphoteric (zwitterionic) surfactants have both cationic and anionic centers attached to the same molecule. Examples of amphoteric surfactants include amphoteric electrolytes such as aminocarboxylic acis and betaines.

Examples of non-ionic surfactants include ethoxylates, such as, for example, ethoxylated adducts of alcohols, such as polyoxyalkylene polyols; amines; fatty acids; fatty acid amides; alkylphenols; ethanolamides; fatty amines; polysiloxanes; fatty acid esters; alkyl or alkylphenyl polyglycol ethers, such as, for example, fatty alcohol polyglycol ethers; alkylglycosides; sugar esters; sorbitan esters; polysorbates or trialkylamine oxides; esters and amides of poly(meth) acrylic acids with polyalkylene glycols or aminopolyalkylene glycols, which at most may be tacked at one end with alkyl groups.

Polymeric surfactants can be divided into two groups of products. The first group includes comb or rake polymers where there is an organic polymeric chain with hydrophobic groups at regular intervals along the chain and hydrophilic groups at random or regular intervals along that chain. The second group of polymeric surfactants includes block co-polymers where there are blocks of hydrophobic groups (B) and blocks of hydrophilic groups (A) usually in A-B-A configuration. Certain polymeric surfactants such as ethylene oxide-propylene oxide co-polymer surfactants can also be classified as non-ionic surfactants.

Preferably, the at least one surfactant is selected from the group consisting of glycerol monostearates, polycarboxylate ethers, polyether-modified polysiloxanes, polyalkylene oxide siloxanes, hydroxyethyl amines, erucamides, stearyl stearamides, alkali metal alkanesulfonates, alkyl aryl sulfonates, and mixtures thereof.

Examples of suitable commercially available glycerol monostearates include Dimodan HP (from Danisco).

Examples of suitable polycarboxylate ethers include polycarboxylate ether-based superplasticizers (PCEs), which are composed by a methoxy-polyethylene glycol copolymer (side chain) grafted with methacrylic acid copolymer (main chain). Suitable commercially available polycarboxylate ether-based superplasticizers include Viscocrete® Polymer PC-2, Viscocrete® Polymer RMC-2, and Cemerol® R-750 MC (from Sika).

Examples of suitable polyether-modified polysiloxanes include polyetherpolysiloxane copolymers. Suitable commercially available polyether-modified polysiloxanes include Tegostab B8870 (from Evonik).

Examples of suitable commercially available polyalkylene oxide siloxanes include Niax L-1500 (from Momentive).

Examples of suitable hydroxyethyl amines include bis(2-hydroxyethyl) amines, which are commercially available as Armostat 300 (from Akzo Nobel).

Examples of suitable commercially available erucamides and stearyl stearamides include Kemamide E180 and Kemamide S180 (from PMC Biogenix).

Examples of suitable alkali metal alkanesulfonates include sodium alkanesulfonates, which are commercially available as Armostat 3002 (from Akzo Nobel) and Loxiol 93P (from Emery Oleochemicals).

Examples of suitable commercially available alkylarylsulfonates include ZetaSphere 2300, 3100 and 3700 (from Airproducts).

Increasing the amount of the surfactant component S in the contact layer increases the amount of hydrated cement grains in the contact layer, which enables stronger bonding of the contact layer with cementitious compositions. The surfactants, however, also have a tendency to migrate from the contact layer into the layer of cementitious composition applied on contact layer. In case the amount of surfactants is increased above a certain limit, the hydration of cement grains is inhibited in the cementitious composition. As a result, the contact layer is very weakly if at all bonded to the cementitious composition.

Preferably, the amount of the surfactant component S is at least 0.1 wt.-%, in particular 0.1-15.0 wt.-%, preferably 0.5-15.0 wt.-%, more preferably 0.5-10.0 wt.-%, most preferably 0.5-5.0 wt.-%, based on the total weight of the contact layer.

Preferably, the surfactant component S comprises at least one surfactant, preferably selected from the group consisting of glycerol monostearates, polycarboxylate ethers, polyether-modified polysiloxanes, polyalkylene oxide siloxanes, hydroxyethyl amines, erucamides, stearyl stearamides, alkali metal alkanesulfonates, and alkyl aryl sulfonates, and the amount of the surfactant component S is 0.1-15.0 wt.-%, in particular 0.5-15.0 wt.-%, preferably 1.0-10.0 wt.-%, more preferably 1.0-5.0 wt.-%, most preferably 1.5-5.0 wt.-%, based on the total weight of the contact layer.

Preferably, the surfactant component S comprises at least two surfactants. It has been found that the concrete adhesion strength of the contact layer is further improved if the contact layer comprises at least two surfactants selected from the group consisting of anionic, cationic, amphoteric, non-ionic surfactants, and polymeric surfactants and mixtures thereof.

Preferably, the at least two surfactants are selected from a group consisting of glycerol monostearates, polycarboxylate ethers, polyether-modified polysiloxanes, polyalkylene oxide siloxanes, hydroxyethyl amines, erucamides, stearyl stearamides, alkali metal alkanesulfonates, alkyl aryl sulfonates, and mixtures thereof.

Preferably, the surfactant component S comprises at least two surfactants, preferably selected from a group consisting of glycerol monostearates, polycarboxylate ethers, polyether-modified polysiloxanes, polyalkylene oxide siloxanes, hydroxyethyl amines, erucamides, stearyl stearamides, alkali metal alkanesulfonates, and alkyl aryl sulfonates, and the amount of the surfactant component S is 1.0-15.0 wt.-%, more preferably 2.0-10.0 wt.-%, most preferably 3.0-5.0, based on the total weight of the contact layer.

Increasing the amount of the thermoplastic polymer component P in the contact layer increases the strength of adhesion by which a contact layer is bonded to thermoplastic layers. However, increasing the amount of the thermoplastic polymer component P above a certain limit tends decrease the concrete adhesion strength of the contact layer. Preferably, the amount of the thermoplastic polymer component P is 20.0-90.0 wt.-%, based on the total weight of the contact layer.

In particular, the amount of the thermoplastic polymer component P is preferably 20.0-85.0 wt.-%, more preferably 30.0-80.0 wt.-%, even more preferably 35.0-75.0 wt.-%, most preferably 40.0-70.0 wt.-%, based on the total weight of the contact layer.

Any kind of thermoplastic polymer component is in principle suitable to be used in the contact layer. Preferably, the thermoplastic polymer component P comprises at least one polymer selected from the group consisting of ethylene-vinyl acetate copolymers (EVA), ethylene-acrylic ester copolymers, ethylene-α-olefin co-polymers, ethylene-propylene co-polymers, polypropylene (PP), polyethylene (PE), polyvinylchloride (PVC), polyethylene terephthalate (PET), polystyrene (PS), polyamides (PA), chlorosulfonated polyethylene (CSPE), ethylene propylene diene rubber (EPDM), polyisobutylene (PIB), and mixtures thereof.

Preferably the thermoplastic polymer component P comprises at least one polymer selected from the group consisting of low-density polyethylene, linear low-density polyethylene, high-density polyethylene, ethylene-vinyl acetate copolymer, ethylene-acrylic ester copolymers, ethylene-α-olefin co-polymers, and ethylene-propylene co-polymers.

The properties of the contact layer were found especially suitable when the thermoplastic polymer component P comprises at least one ethylene-vinyl acetate copolymer having a content of a structural unit derived from vinyl acetate (hereinafter referred to as "vinyl acetate unit") of at least 7.0 wt.-%, more preferably at least 20.0 wt.-%, even more preferably at least 30.0 wt.-%, most preferably at least 35.0 wt.-%.

Preferably, the at least one ethylene-vinyl acetate copolymer has a content of vinyl acetate unit in the range from 7.0 wt.-% to 90.0 wt.-%, more preferably from 7.0 to 80.0 wt.-%, most preferably from 7.0 to 70.0 wt.-%.

Preferably, the amount of the at least one ethylene-vinyl acetate co-polymer is at least 5.0 wt.-%, more preferably at least 10.0 wt.-%, most preferably at least 15.0 wt.-%, based on the total weight of the thermoplastic polymer component P. In particular, the amount of the at least one ethylene-vinyl acetate co-polymer is in the range from 5.0 wt.-% to 90.0 wt.-%, preferably from 10.0 to 90.0 wt.-%, more preferably from 15.0 to 80 wt.-%, most preferably from 15.0 to 70.0 wt.-%.

The amount of the at least one ethylene-vinyl acetate co-polymer, preferably having a content of vinyl acetate unit of at least 7.0 wt.-%, more preferably at least 20.0 wt.-%, is preferably at least 30.0 wt.-%, more preferably at least 35.0 wt.-%, even more preferably at least 40.0 wt.-%, most preferably at least 50.0 wt.-%, based on the total amount of the thermoplastic polymer component P.

The contact layer can comprise, in addition to the mineral binder component B, the thermoplastic polymer component P, and the surfactant component S additives such as UV- and heat stabilizers, plasticizers, foaming agents, dyes, colorants, pigments, matting agents, antistatic agents, impact modifiers, flame retardants, and processing aids such as lubricants, slip agents, antiblock agents, and denest aids.

Typically, the contact layer contains only small amounts of water before it is contacted with a fresh cementitious composition. Preferably, the amount of water in the contact layer is less than 5.0 wt.-%, preferably less than 3.0 wt.-%, even more preferably less than 1.5 wt.-%, based on the total weight of the contact layer. In particular, the amount of water in the contact layer can be less than 2.0 wt.-%, preferably less than 1.0 wt.-%, even more preferably less than 0.5 wt.-%, based on the total weight of the contact layer.

The mineral binders in the contact layer should remain in substantially non-hydrated state at least until the contact layer is contacted with a composition containing water, such as fresh cementitious composition. Hydration of the mineral binder particles contained in the contact layer would decrease the flexibility and thus deteriorate the handling properties of the contact layer. It would also affect negatively the concrete adhesion strength of the contact layer. It has been found that the mineral binders contained in the contact layer remain in substantially non-hydrated if the contact layer is stored for several weeks at normal room temperature and relative humidity of 50%.

The contact layer may comprise not more than 10.0 wt.-%, preferably not more than 5.0 wt.-% of hydrated mineral binders, based on the total weight of the contact layer. Preferably, the contact layer comprises not more than 3.0 wt.-%, more preferably not more than 1.5 wt.-%, even more preferably not more than 1.0 wt.-%, even more preferably not more than 0.5 wt.-%, most preferably not more than 0.1 wt.-% of hydrated mineral binders, based on the total weight of the contact layer.

In order to produce a contact layer containing non-hydrated mineral binders, the mineral binder component B is preferably mixed with the thermoplastic polymer component P and the surfactant component S in dry form, i.e. without being mixed with water. Mixing the mineral binder with water would result in initiation of the hydration reactions, which is not desired. The contact layer of the present invention is preferably obtained by melt-processing a composition containing the mineral binder component B, the thermoplastic polymer component P and the surfactant component S to a homogenized melt, which is then further processed into a shaped article. The homogenized melt can be, for example, extruded through a manifold or a flat die followed by cooling the extruded material between calender cooling rolls.

The homogenized melt is preferably obtained by melt-processing a composition comprising the mineral binder component B, the thermoplastic polymer component P, and the surfactant component S at a temperature, which is above the melting point of point of the thermoplastic polymer component P. Preferably, the homogenized melt is substantially free of water. In particular, the amount of water in the homogenized melt is less than 5.0 wt.-%, preferably less than 2.5 wt.-%, more preferably less than 1.0 wt.-%, even more preferably less than 0.5 wt.-%, most preferably less than 0.1 wt.-%, based on the total weight of the homogenized melt.

The surface of the contact layer is preferably non-tacky at normal room temperature (25° C.). Whether a surface of a specimen is tacky or not can be determined by pressing the surface with the thumb at a pressure of about 5 kg for 1 second and then trying to lift the specimen by raising the hand. In case the thumb does not remain adhered to the surface and the specimen cannot be raised up, the surface is considered to be non-tacky. In the context of membrane of the present invention, the "specimen" used in the tackiness test refers to a membrane having width of 10 cm and length of 20 cm.

There are no particular restrictions for the thickness of the contact layer. However, contact layers having a thickness of above 50 mm are not practical in waterproofing or roofing applications and contact layers with a thickness of below 50 µm have been found to be difficult to produce with the desired mechanical properties. In particular, the contact layer has a thickness of at least 0.1 mm, preferably of 0.1-75.0 mm, more preferably 0.1-25.0 mm, most preferably 0.1-10.0 mm. Preferably, the contact layer has a thickness of 0.1-50.0 mm, preferably 0.2-10.0 mm, more preferably 0.3-5.0 mm, most preferably 0.4-2.0 mm. The thickness of the contact layer is measured according to EN 1849-2 standard.

It is preferable that the contact layer has a certain flexibility to allow it to be wound into rolls, typically during production, and then easily applied to a surface of a substrate. The inventors of the present invention, however, also have found that contact layers with certain flexibility have better concrete adhesion strength. Preferably, the contact layer has a shear modulus at a temperature of 30° C. according to EN ISO 6721-2:2008 of less than 600 MPa, more preferably less than 200 MPa, and most preferably less than 100 MPa.

The contact layer preferably has a mass per unit area of 100-10000 g/m2, more preferably of 200-6000 g/m2, even more preferably of 300-3000 g/m2. The mass per unit area is measured according to EN 1849-2.

The density of the contact layer is preferably 0.25-3.00 g/cm$^3$, particularly 0.30-2.75 g/cm$^3$, more preferably 0.35-2.50 g/cm$^3$, even more preferably 0.40-2.00 g/cm$^3$, most preferably 0.50-1.50 g/cm$^3$. The density of the contact layer is measured by using the buoyancy method.

In order to improve the mechanical properties of the contact layer, it can be advantageous that the contact layer is reinforced with a layer of fiber material bonded to one of its surfaces. The reinforcement layer can be in the form of a fiber mat, a fiber-woven fabric or a fibrous tissue. Particularly suitable materials for the reinforcement layer include glass fibers, polyester fibers or nylon fibers.

It may be advantageous that the contact layer comprises a first and second reinforcement layers bonded to the first and second surfaces of the contact layer, respectively.

The preferences given above for the mineral binder component B, the thermoplastic polymer component P, and to the surfactant component apply equally to all aspects of the invention.

In another aspect of the present invention, a method for producing a contact layer, as it was described above in detail, is provided. The method for producing a contact layer is not particularly limited and any conventional technology used for producing sheets and films from plastic materials can be used.

The contact layer can be produced by extruding, calendering, compressing or casting a homogenized melt comprising the components of the contact layer.

Preferably, the method for producing a contact layer comprises extruding and/or calendering a homogenized melt comprising the components of the contact layer.

The homogenized melt can be obtained by melt-processing a composition comprising mineral binder component B, the thermoplastic polymer component P, and the surfactant component S in an extruder or kneader. The melt-processing is preferably conducted at a temperature that is higher than the melting point of the thermoplastic polymer component P, typically at least 20° C. higher, preferably at least 30° C. higher. Preferably, the amount of water in the homogenized melt is less than 1.0 wt.-%, preferably less than 0.5 wt.-%, most preferably less than 0.1 wt.-%.

Preferably, the thermoplastic polymer component P is melt-processed in an extruder before the mineral binder component B is fed into the extruder through a side feeder. Some or all of the components of the composition can also be first mixed in a mixing device to obtain a dry blend, which is then melt-processed in extruder or kneader. The components of the composition can also be first mixed in a compounding extruder to obtain pellets or granulates, which are then fed into extruder or kneader.

Preferably, the contact layer is produced by an extrusion process. In the extrusion process, a homogenized melt comprising the mineral binder component B, the thermoplastic polymer component P, and the surfactant component S through a manifold or a flat, annular, slot or cast die, preferably through a manifold or a flat die, and quenching the extruded web of material between water cooled chill rolls. The thickness of the produced contact layer can be controlled by die lip adjustment and/or by adjusting the gap size between the chill rolls. Any conventional extruder apparatus used for producing flat film sheet as described in "Kunststoff Verarbeitung" by Schwarz, Ebeling and Furth, 10$^{th}$ Edition 2005, Vogel Buchverlag, paragraph 5.7.2 can be used in the extrusion process.

The optimal extrusion temperature depends on the composition of the contact layer and on the desired throughput of the extrusion process. The extrusion temperature is preferably 80-250° C., more preferably 100-240° C., even more preferably 120-220° C., most preferably 140-200° C. The term "extrusion temperature" refers to the temperature of the molten material in the extruder die or manifold. Contact layers extruded at a temperature within the above described temperature ranges were found to provide particularly good concrete adhesion strengths.

Preferably, the extrusion pressure is 20.0-350.0 bar, more preferably 30.0-240 bar, even more preferably 35.0-200 bar, most preferably 40.0-130.0 bar. The term "extrusion pressure" refers to the pressure of the molten material inside the extruder just before the material enters the extruder die or manifold.

The gap size between the cooling rolls can be wider than the thickness of the produced contact layer. For example, the gap size between the cooling rolls can be 10%, 25%, 50%, or 75% wider than the thickness of the produced contact layer.

The contact layer can also be produced by a calendering process. In the calendering process, a homogenized melt comprising the mineral binder component B, the thermoplastic polymer component P, and the surfactant component S is passed between a series of calender rolls, in the course of which the homogenized melt is spread across the width of the rolls, stretched and finally cooled to the form of a film or sheet with defined thickness. The homogenized melt can be fed with an extruder to the top of the calendering section and into the gap between the first and second rolls. Preferably, the calendering section comprises at least four calender rolls. Any conventional calendering apparatus used for producing films or sheets from thermoplastic materials as described in "Kunststoff Verarbeitung" by Schwarz, Ebeling and Furth, 10$^{th}$ Edition 2005, Vogel Buchverlag, chapter 3 can be used in the calendering process.

The homogenized melt can comprise, in addition to the mineral binder component B, the thermoplastic polymer component P, and the surfactant component S typical additives used in extrusion and calendering processes such as internal lubricants, slip agents, antiblock agents, denest aids, oxidative stabilizers, melt strength enhancers. The homogenized melt can also further comprise other additives such as UV- and heat stabilizers, plasticizers, foaming agents, dyes, colorants, pigments, matting agents, antistatic agents, impact modifiers, and flame retardants.

According to one embodiment, the homogenized melt comprises, in addition to the mineral binder component B, the thermoplastic polymer component P and the surfactant component S at least one chemical or physical foaming agent and optionally at least one activator for the foaming agent. Examples of suitable chemical foaming agents include azodicarbonamide, azobisisobutyronitrile, benzenesulphonyl hydrazide, 4,4-oxybenzenesulphonyl semicarbazide, 4,4-oxybis(benzenesulphonyl hydrazide), diphenyl sulphone-3,3-disulphonyl hydrazide, p-toluenesulphonyl semicarbazide, sodium bicarbonate, ammonium carbonate, ammonium bicarbonate, potassium bicarbonate, diazoaminobenzene, diazoaminotoluene, hydrazodicarbonamide, diazoisobutyronitrile, barium azodicarboxylate and 5-hydroxytetrazole. Preferably, the foaming agent is sodium bicarbonate.

It has also been found that subjecting the contact layer to a washing step before contacting it with a fresh cementitious composition has a positive effect on the concrete adhesion strength especially in case the amount of the surfactant component S in the contact layer is near the upper limit of the preferable range. Water can be used as a washing liquid in the washing step. The method for producing a contact layer can further comprise subjecting the contact layer to a washing step.

The method for producing a contact layer can also comprise a post-treatment step such as brushing and/or sand blasting and/or plasma treatment, in particular air plasma treatment step, to optimize the surface properties of the produced contact layer. The final product is preferably stored in the form of rolls.

In another aspect of the present invention a method for binding two substrates to each other is provided. The substrates can be any objects having a surface, which can be covered with a contact layer.

The method for binding two substrates to each other comprises steps of:
  a) applying a layer of first adhesive on the surface of a first substrate,
  b) covering the layer of the first adhesive with a contact layer according of the present invention such that a first surface of the contact layer is brought in contact with the layer of the first adhesive,
  c) applying a layer of a second adhesive on the second opposite surface of the contact layer and contacting the layer of the second adhesive with the surface of the second substrate or applying a layer of a second adhesive on a surface of the second substrate and contacting the layer of the second adhesive with the second opposite surface of the contact layer
  d) letting the layers of the first and second adhesives to harden.

The first and the second adhesives can be fresh cementitious compositions or synthetic resin compositions, such as epoxy based two-component adhesive or EVA-based adhesive, preferably fresh cementitious compositions.

Preferably, the first and second substrates consist of or comprise material selected from the group consisting of hardened cementitious compositions, wood, plywood, particle board, gypsum board, metal, metal alloy, plastic, thermal insulation material, or a combination thereof.

The substrates can consist of or comprise same material or different material. Preferably, at least one of the substrates consists of hardened concrete.

In another aspect of the present invention a method for waterproofing a substrate is provided. The substrate can be any structural or civil engineering structure, which is to be sealed against moisture and water. The surface of the substrate can be orientated horizontally or not.

The method for waterproofing a substrate comprises steps of
applying a contact layer according to the present invention to a surface of a substrate such that a first surface of the contact layer is directed against the surface of the substrate,
casting a fresh cementitious composition on a second opposing surface of the contact layer, and
hardening the fresh cementitious composition.

Preferably, the fresh cementitious composition is a fresh concrete composition.

The casted cementitious composition after hardening can be part of a structure, in particular, an above-ground or underground structure, for example a building, garage, tunnel, landfill, water retention, pond, dike or an element for use in pre-fabricated constructions.

In another aspect of the present invention a waterproofed construction for waterproofing a substrate against water penetration is provided. The waterproofed construction comprises a layer of concrete and a contact layer according to the present invention arranged between surface of a substrate and the layer of concrete such that the first surface of the contact layer is directed against the surface of the substrate and the second surface of the contact layer is fully bonded to the surface of the layer of concrete.

The term "fully bonded" refers to two surfaces being adhesively joined over the full surface.

The substrate can be any structural or civil engineering structure, which is to be sealed against moisture and water, such as a hardened concrete structure or a subsurface.

In another aspect of the present invention a method for sealing a substrate against water penetration is provided. The method for sealing a substrate against water penetration comprises steps of
applying a layer of adhesive on the surface of the substrate,
covering the layer of the adhesive with a contact layer of the present invention such that one of the surfaces of the contact layer brought in contact with the layer of adhesive, and
hardening the layer of adhesive.

The adhesive can be a fresh cementitious composition or a synthetic resin based adhesive, such as epoxy based two-component adhesive or EVA-based adhesive, preferably a fresh cementitious composition, particularly a fresh concrete or a fresh shotcrete composition.

The adhesive can be a fresh cementitious composition or a synthetic resin based adhesive such as epoxy based two-component adhesive or EVA-based adhesive, preferably a fresh cementitious composition, particularly a fresh concrete or shotcrete composition.

According to one embodiment, the method for sealing a substrate against water penetration comprises steps of
applying a layer of adhesive on one of the surfaces of a contact layer of the present invention,
covering surface of the substrate with the contact layer such that the layer of adhesive is brought in contact with surface of the substrate, and
hardening the layer of adhesive.

The adhesive can be a fresh cementitious composition or a synthetic resin based adhesive such as epoxy based two-component adhesive or EVA-based adhesive, preferably a fresh cementitious composition, particularly a fresh concrete or shotcrete composition.

In another aspect of the present invention a sealed construction for sealing a substrate against water penetration is provided. The sealed construction comprises a contact layer according to the present invention and a layer of adhesive arranged between a surface of the substrate and the contact layer such that one of the surfaces of the contact layer is bonded to the surface of the substrate with the layer of adhesive.

The adhesive can be a fresh cementitious composition or a synthetic resin based adhesive such as epoxy based two-component adhesive or EVA-based adhesive, preferably a fresh cementitious composition, particularly a fresh concrete or shotcrete composition.

In another aspect of the present invention use of the contact layer according to the present invention as a waterproofing membrane is provided.

EXAMPLES

The materials shown in Table 1 were used in the experiments.

TABLE 1

Materials used in the experiments

| Polymers | | | E-Modulus [Mpa] |
|---|---|---|---|
| EVA copolymer with 28 wt.-% vinyl acetate | Elvax ® 265A | DuPont | 19 |
| EVA copolymer with 40 wt.-% vinyl acetate | Levapreen ® 400 | Lanxess | 4.5 |
| Ethylene-propylene copolymer with ca. 20 wt.-% ethylene | Hifax ® CA 212 | BaseII | 80 |
| Ethylene-propylene copolymer with 16 wt.-% ethylene | Vistamaxx ® 6202 | ExxonMobil | 10 |
| Cement | | | |
| CEM I/42.5 cement | Normo ® 4 | LafargeHolcim | |
| Surfactants | | | |
| Glycerol monostearate | Dimodan ® HP | Danisco | |
| Polyether-modified polysiloxan | Tegostab ® B8870 | Evonik | |
| Anionic compound | Loxiol ® 93P | Emery Oleochemicals | |
| Ionic compound | Zetasphere ® 3700 | AirProducts | |
| Poly carboxylate ether | Viscocrete ® PC-2 | Sika | |

[a] EVA, ethylene vinyl acetate copolymer
[c] E-modulus measured according to ISO 527-3 standard at a temperature of 23° C.

For the measurement of the average peel resistances, each contact layer was bonded to a thermoplastic barrier layer to obtain an example membrane, which could be used in the peel resistance test.

Preparation of the Test Membranes

For each example membrane (EX1-EX16), a contact layer (E) was first produced by hot-pressing from a homogenized melt comprising the components of the respective contact layer.

The homogeneous melt of the contact layer was obtained by melt-homogenizing a composition comprising the components of the contact layer on a two-roll mill (from Labtech Engineering). The melt-homogenizing was conducted at a temperature, which is approximately 30° C. above the melting temperature of the polymer component. Sheets with a thickness of approximately 1 mm were subsequently pressed from the homogeneous melt using a hot press. The temperature of the material during pressing was kept approximately 30° C. above the melting temperature of the polymer component.

Finally, the example membranes were produced by laminating each contact layer onto a polyethylene-based barrier layer (WP 1210-06-H available from Sika) in a hot press.

The compositions and Young's modulus measured at a temperature of 23° C. of the contact layers (E) for the example membranes EX1-EX16 are presented in Tables 2 and 3.

Preparation of the Test Concrete Specimen

Three sample membranes with a dimension of 159 mm (length)×39 mm (width) were cut from each of the example membranes EX1-EX16 produced as described above. The sample membranes were placed into formworks having a dimension of 160 mm (length)×45 mm (width)×30 mm (height) with the contact layer facing upwards and the thermoplastic barrier layer against the bottom of the formwork.

One edge of each sample membrane on the side of the contact layer was covered with an adhesive tape having a length of 50 mm and width coinciding with the width of the membrane sample to prevent the adhesion to the hardened concrete. The adhesive tapes were used to provide easier installation of the test specimens to the peel resistance testing apparatus.

For the preparation of concrete test specimens a batch of fresh concrete formulation was prepared. The fresh concrete formulation was obtained by blending 46.3 wt.-% sand having a particle size of 0-1 mm, 7.1 wt.-% Nekafill-15 (from KFN) (limestone filler), 32.1 wt.-% CEM I 42.5 N cement (Holcim Normo 4), 14.3 wt.-% water and 0.2 wt.-% Viscocrete® PC 2 solution. The dry components were mixed and homogenized for 2 minutes in a tumbling mixer. After adding water and Viscocrete® solution the concrete mixture was homogenized for 5 minutes in a cement mixer.

The formworks containing the sample membranes were subsequently filled with the fresh concrete formulation and vibrated for 30 seconds to release the entrapped air. After hardening for one day the test concrete specimens were stripped from the formworks and stored at humid atmosphere (temperature 23° C., relative air humidity 100%) before measuring the peel resistances.

Measurement of Peel Resistances

The measurement for peel resistances of sample membranes from hardened concrete specimen was conducted in accordance with the procedure laid out in the standard DIN EN 1372:2015-06. A peel resistance testing apparatus fulfilling the requirements of the DIN EN 1372:2015 standard was used for conducting the peel resistance measurements.

For the peel resistance measurements, a concrete specimen was clamped with the upper grip of the material testing apparatus for a length of 10 mm at the end of the concrete specimen comprising the taped section of the sample membrane. Following, the sample membrane was peeled off from the surface of the concrete specimen at a peeling angle of 90° and at a constant cross beam speed of 100 mm/min. The peeling of the sample membrane was continued until the entire sample membrane was peeled off from the surface of the concrete specimen. The values for peel resistance were calculated as average peel force [N/50 mm] during peeling over a length of approximately 70 mm thus excluding the first and last quarter of the total peeling length from the calculation.

The average peel resistance values for example membranes EX1-EX16 presented in Tables 2 and 3 have been calculated as an average of measured values obtained with three sample membranes cut from the same example membrane.

TABLE 2

Compositions of the contact layers and measured peel resistances for test membranes EX1-EX8

| Contact layer | EX1 | EX2 | EX3 | EX4 | EX5 | EX6 | EX7 | EX8 |
|---|---|---|---|---|---|---|---|---|
| Polymer component | | | | | | | | |
| Elvax 260 A [wt.-%] | 25 | 13 | 8.7 | 4.3 | 6.3 | 7.7 | 7.0 | 6.3 |
| Levapreen 400 [wt.-%] | | | 4.3 | 8.7 | 12.7 | 15.3 | 14 | 12.7 |
| Young's modulus [MPa] | 19 | 19 | 13 | 8 | 13 | 13 | 13 | 13 |
| Mineral binder component | | | | | | | | |
| Holcim Normo 4 [wt.-%] | 75 | 75 | 75 | 75 | 75 | 75 | 75 | 75 |
| Surfactant component | | | | | | | | |
| Dimodan HP [wt.-%] | 0 | 10 | 10 | 10 | 4 | | | |
| Loxiol 93P [wt.-%] | | | | | | | 2 | 4 |
| Viscocrete® PC 2 [wt.-%] | 0 | 2 | 2 | 2 | 2 | 2 | 2 | 2 |
| 7 days [N/50 mm] | 0 | 20 | 31 | 38 | 16 | 11 | 37 | 0 |
| 28 days [N/50 mm] | 0 | 38 | 25 | 34 | 11 | 19 | 33 | 9 |
| 56 days [N/50 mm] | 0 | 30 | 41 | 39 | 25 | 15 | 100 | 15 |

TABLE 3

Compositions of the contact layers and measured peel resistances for test membranes EX9-EX16

| Contact layer | EX9 | EX10 | EX11 | EX12 | EX13 | EX14 | EX15 | EX16 |
|---|---|---|---|---|---|---|---|---|
| Polymer component | | | | | | | | |
| Hifax CA212 [wt.-%] | 25 | 17 | 17 | 11 | | | | |
| Vistamaxx 6202 [wt.-%] | | | | | 24 | 24 | 23 | 22 |
| Young's modulus [MPa] | n.a | n.a | n.a | n.a | n.a | n.a | n.a | n.a |
| Mineral binder component | | | | | | | | |
| Holcim Normo 4 [wt.-%] | 75 | 75 | 75 | 75 | 75 | 75 | 75 | 75 |
| Surfactant component | | | | | | | | |
| Tegastab B8870 [wt.-%] | 0 | 4 | | | | | | |
| Zetasphere 3700 [wt.-%] | | | 4 | 10 | 0.5 | 0.5 | 1 | 1 |
| Viscocrete® | 0 | 4 | 4 | 4 | 0.5 | 1 | 1 | 2 |

TABLE 3-continued

Compositions of the contact layers and measured peel resistances for test membranes EX9-EX16

| Contact layer | EX9 | EX10 | EX11 | EX12 | EX13 | EX14 | EX15 | EX16 |
|---|---|---|---|---|---|---|---|---|
| PC 2 [wt.-%] | | | | | | | | |
| 7 days [N/50 mm] | 0 | 0 | 3 | 0 | 0 | 0 | 0 | 0 |
| 28 days [N/50 mm] | 0 | 0 | 6 | 5 | 2 | 1 | 2 | 17 |

The invention claimed is:

1. A contact layer comprising a mineral binder component B, a thermoplastic polymer component P and a surfactant component S,
   wherein the amount of the mineral binder component B is in a range of 10.0 to 90.0 wt.-% based on the total weight of the contact layer,
   the thermoplastic polymer component P comprises at least one polymer selected from the group consisting of ethylene-vinyl acetate co-polymers (EVA), ethylene-acrylic ester copolymers, ethylene-α-olefin co-polymers, ethylene-propylene co-polymers polypropylene (PP), polyethylene (PE), polyvinylchloride (PVC), polyethylene terephthalate (PET), polystyrene (PS), polyamides (PA), chlorosulfonated polyethylene (CSPE), ethylene propylene diene rubber (EPDM), and polyisobutylene (PIB),
   the contact layer is formed by extruding a homogenized melt comprising the mineral binder component B, the thermoplastic polymer component P, and the surfactant component S through a manifold or a flat die followed by cooling the extruded material between calendar cooling rolls, the homogenized melt being formed by melt-processing a composition comprising the mineral binder component B, the thermoplastic polymer component P, and the surfactant component S at a temperature, which is above the melting point of point of the thermoplastic polymer component P, and
   the amount of water in the homogenized melt is less than 1.0 wt.-%.

2. The contact layer according to claim 1 comprising not more than 3.0 wt.-% based on the total weight of the contact layer.

3. The contact layer according to claim 1, wherein the contact layer has a concrete adhesion strength of at least 5 N/50 mm.

4. The contact layer according to claim 1, wherein the mineral binder component B comprises at least one mineral binder selected from the group consisting of hydraulic binders, non-hydraulic binders, latent hydraulic binders, and pozzolanic binders, and mixtures thereof.

5. The contact layer according to claim 1, wherein the surfactant component S comprises at least one surfactant selected from the group consisting of anionic, cationic, non-ionic, amphoteric, and polymeric surfactants, and mixtures thereof.

6. The contact layer according to claim 5, wherein the at least one surfactant is selected from the group consisting of glycerol monostearates, polycarboxylate ethers, polyether-modified polysiloxanes, polyalkylene oxide siloxanes, hydroxyethyl amines, erucamides, stearyl stearamides, alkali metal alkanesulfonates, alkyl aryl sulfonates, and mixtures thereof.

7. The contact layer according to claim 1, wherein the amount of the surfactant component S is in a range of 0.1 to 15.0 wt.-% based on the total weight of the contact layer.

8. The contact layer according to claim 1, wherein the amount of the thermoplastic polymer component P is in a range of 20.0 to 85.0 wt.-% based on the total weight of the contact layer.

9. The contact layer according to claim 1, wherein the contact layer has a thickness in a range of 0.1 to 50.0 mm.

10. A method for producing a contact layer according to claim 1, wherein the method comprises extruding and/or calendering a homogenized melt comprising the components of the contact layer.

11. A method for binding substrates to each other, the method comprising steps of:
   a) applying a layer of first adhesive on the surface of a first substrate,
   b) covering the layer of the first adhesive with the contact layer according to claim 1 such that a first surface of the contact layer is brought in contact with the layer of the first adhesive,
   c) applying a layer of a second adhesive on the second opposite surface of the contact layer and contacting the layer of the second adhesive with the surface of the second substrate or applying a layer of a second adhesive on a surface of the second substrate and contacting the layer of the second adhesive with the second opposite surface of the contact layer,
   d) hardening the layers of the first and second adhesives, wherein at least one of the first and second adhesives is a fresh cementitious composition or a synthetic resin composition.

12. A method for waterproofing a substrate, the method comprising steps of
   applying a contact layer according to claim 1 to a surface of a substrate such that a first surface of the contact layer is directed against the surface of the substrate,
   casting a fresh cementitious composition on a second opposing surface of the contact layer, and
   hardening the fresh cementitious composition.

13. A waterproofed construction comprising a layer of concrete and a contact layer according to claim 1 arranged between a surface of a substrate and the layer of concrete such that the first surface of the contact layer is directed against a surface of a substrate and the second surface of the contact layer is fully bonded to the layer of concrete.

14. A method for sealing a substrate against water penetration, the method comprising steps of
   applying a layer of adhesive on the surface of the substrate,
   covering the layer of the adhesive with a contact layer according to claim 1 such that one of the surfaces of the contact layer is brought in contact with the layer of adhesive, and
   hardening the layer of adhesive.

15. A sealed construction comprising a contact layer according to claim 1 and a layer of adhesive arranged between a surface of a substrate and the contact layer such that one of the surfaces of the contact layer is bonded to the surface of the substrate with the layer of adhesive.

16. A method according to claim 1 for producing the contact layer as a waterproofing membrane.

17. The contact layer according to claim 1, wherein the amount of the mineral binder component B is in a range of 20.0 to 85.0 wt.-% based on the total weight of the contact layer.

18. The contact layer according to claim 1, wherein the mineral binder component B is dispersed uniformly throughout the thermoplastic polymer component P in the contact layer.

* * * * *